March 5, 1946. W. E. SCHWANHAUSSER 2,395,975
OPAQUE COPY PROJECTOR
Filed March 14, 1945 3 Sheets-Sheet 3

INVENTOR.
WALTER E. SCHWANHAUSSER
BY
ATTORNEY.

Patented Mar. 5, 1946

2,395,975

UNITED STATES PATENT OFFICE 2,395,975

OPAQUE COPY PROJECTOR

Walter E. Schwanhausser, Maplewood, N. J., assignor to Charles Beseler Company, New York, N. Y., a partnership Application March 14, 1945, Serial No. 582,638

7 Claims. (Cl. 88—24)

The invention relates to image projection apparatus, more especially of the nature wherein the image projected is from opaque copy illuminated by a beam of light impinging thereon from a suitable source of illumination.

In apparatus of this type, it is the practice generally to locate the copy upon a level (horizontal) surface which supports, also, the apparatus comprising a housing provided with an aperture or window at the bottom and with respect to which the copy is to be juxtaposed. Or, in some forms, the copy is juxtaposed to an aperture located in a vertical rear wall without provision of a mirror for illumination of the copy.

These constructions of apparatus, aside from the inconvenience in positioning copy for projection, involve a bulky and unnecessarily extended housing for accommodating the source of illumination with its reflector, as well as the projecting lens. Also, with some types, the image projected thereby is reversed or in a "right-left" position.

It is an object of the present invention to provide projection apparatus of the nature set forth in which the copy-receiving aperture is most accessible, enabling copy to be quickly and accurately positioned thereover.

Another object of the invention is to provide a reflection system which will admit of constructing a projection apparatus of compact and readily portable form.

Still another object of the invention is to facilitate cooling of the apparatus when in operation and to provide therewith satisfactory baffling of light rays from the source of illumination.

A further object of the invention is to utilize an electric, concentrated-filament projection lamp as the source of illumination, and to so mount the same as to enhance its useful life.

A still further object of the invention is to so locate the source of illumination with respect to the opaque copy, as in close proximity thereto, that maximum illumination of the latter is secured.

Another object of the invention is to reverse the direction of the light beam from the source of illumination prior to its reflection into the projecting lens.

The invention has for an object, also, to intercept or screen the filament section of an electric lamp, constituting the source of illumination, against its image appearing on the illuminated copy and thus being projected.

In carrying out the invention, an enclosing housing is provided for the various elements, and it is specially constructed to insure compactness and simplicity of operation of the projector. To this end, the walls of the housing are generally of rectangular shape and are arranged horizontally and vertically with respect to one another except for the upper portion of the front or projection wall portion which recedes inwardly or is inclined toward the rear to meet the top wall. The latter is provided with a ventilation outlet or opening located immediately over the source of illumination—an electric lamp. This lamp, in accordance with the invention, is to be supported in the housing and in an upright or erect position which is the most suitable one to promote convection of the heat developed by the lamp during operation of the projector, and to insure a much longer useful life of said lamp.

Behind the lamp and between it and the rear wall of the housing is located a reflector which is positioned coaxially with a copy-receiving aperture or window provided in the said upper inclined portion of the front wall. This reflector is designed to reflect a beam of light from the lamp horizontally toward the said aperture to illuminate properly copy placed thereon; and provision is made to intercept or screen the filament section of said lamp so that no image thereof will appear on the copy and its projected image.

From the copy, supported in inclined position over said aperture and, preferably, at an angle of 45 degrees to the front wall (vertical), the light rays (copy) are picked up downwardly, in a direction generally reverse to the copy impinging rays as reflected from the lamp, by a second reflector or mirror mounted in the lower portion of the housing and positioned at an angle of 22½ degrees to the vertical. This mirror is designed to reflect the copy image rays substantially parallel to the original rays from the lamp, as reflected by the first-named reflector, and in the same direction. These further reflected rays then pass through an objective lens having its barrel mounted adjustably in the lower and vertical portion of the said front wall so as to be conveniently accessible for focussing the image of the copy on a suitable screen, as is well understood.

The nature of the invention, however, will best be understood when described in connection with the accompanying drawings, in which.

Figure 1:
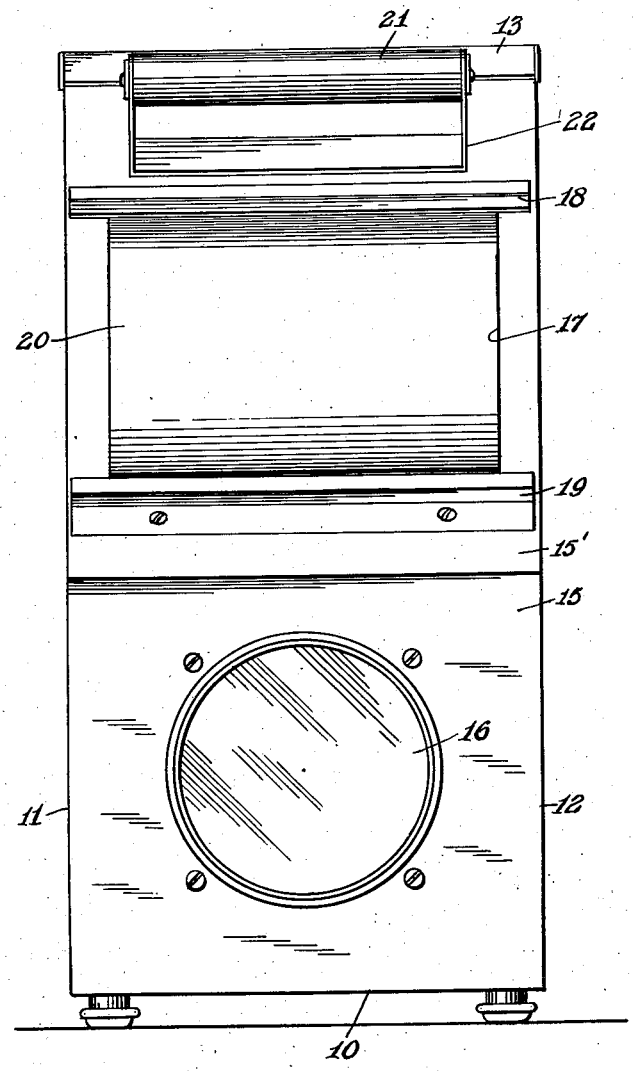
Fig. 1 is a front elevation of the novel projector.
Figure 2:
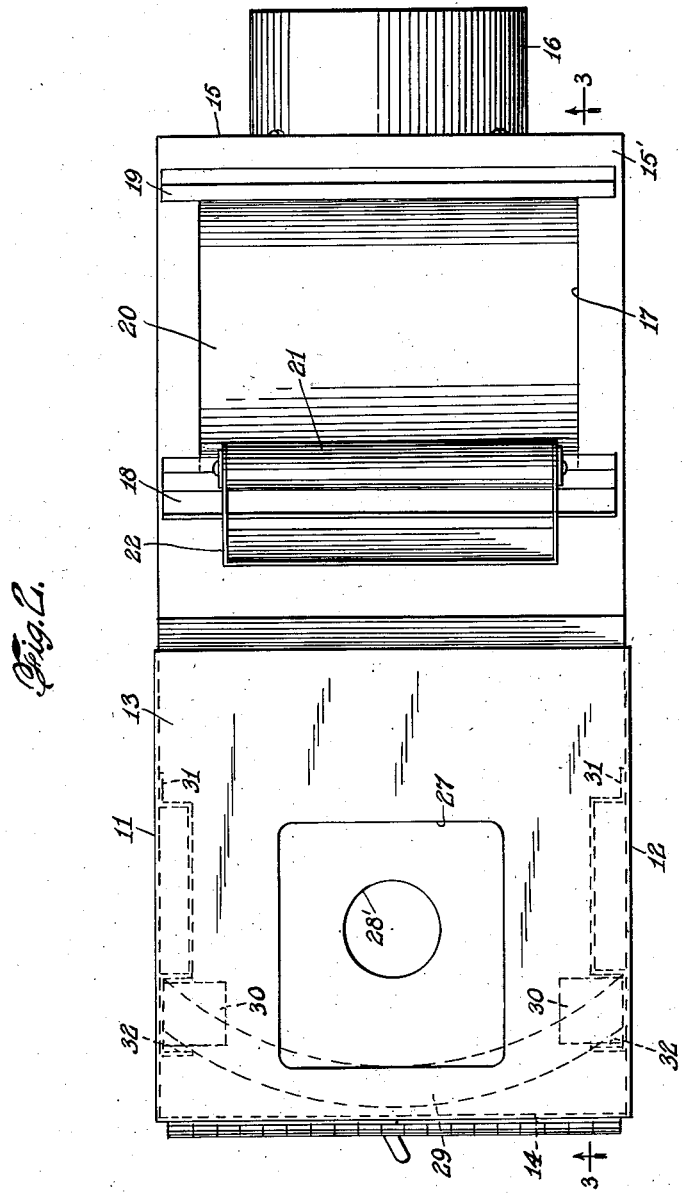
Fig. 2 is a plan thereof.

Referring to the drawings, a housing for the various optical elements of the projector is constructed, for example, of more or less rectangular walls, preferably of sheet metal or other suitable material. Thus, a bottom 10 is provided having feet for supporting the housing as a whole, and from this bottom side walls 11 and 12 extend upwardly to a top piece or cover 13. A rear wall 14 is also provided to close the housing at the rear and over the top edge of which the cover 13 is hinged; and a front wall 15 extends upwardly from the bottom 10 vertically for a distance sufficient to accommodate the objective lens 16 of the projector. The said front wall then is inclined rearwardly as at 15', preferably at an angle of 45 degrees to the vertical, to meet the top wall 13 which overlaps it.

This rearwardly-directed wall portion 15' is provided with a window or copy-receiving aperture 17 bounded along the top and bottom edges by respective copy-holding guides 18 and 19 into which the copy to be projected is conveniently slid and removed manually. The copy to be projected is preferably mounted in a backing slide or carrier member 20 to this end, the said member being designed to be introduced into and withdrawn with copy into the holding guides. A handle 21 attached to the front wall portion 15', by a pair of uprights of a bracket 22 immediately above the upper guide 18, serves in positioning the projectors and for transporting the same manually.

At the rear of said housing and in the upper portion thereof, there is mounted a suitable source of illumination such, for example, as the electric, concentrated-filament projecting lamp 25. The mounting may be conveniently effected by means of a bracket 26 attached to one of the side walls 11 and 12, in the embodiment shown the wall 11; and the mounting is such that the said lamp will be maintained in an erect position (vertical) terminating slightly below the top wall 13. The latter is provided with a relatively large opening 27 in the longitudinal axis of said lamp, and there is interposed between the opening 27 and the upper end of the lamp a light baffle 28 in the nature of plate or cover hinged to the inner face of the rear wall 14. The baffle 28 is provided with a small opening 28' in the longitudinal axis of the lamp and insures against undue leakage of light exteriorly of the housing but at the same time permitting adequate ventilation through said openings, being particulary effective in this respect since the tip of the lamp is located in such close proximity thereto.

Behind the said lamp 25 is located a parabolic reflector 29 designed to reflect light rays from the lamp toward the copy-receiving aperture 17 with which it is coaxial. The reflector is conveniently mounted in the housing by supporting its lower edge on inturned shelves 30, of a pair of channel members 31 attached oppositely to the respective side walls, and guiding said reflector in vertical guides 32 of the respective members. The upper edge of the reflector is adapted to be held against vertical displacement by contact with the under side of the hinged light baffle 28.

To prevent an image of the filament of lamp 25 from appearing on the copy when a light beam is directed by the reflector 29 horizontally toward copy positioned over the aperture 17, an opaque member such as the metal plate 33 is provided in front of the lamp over a portion thereof sufficient to screen out its concentrated filament section; and this screen is mounted on a bracket 34 secured to the side wall 11.

A downward extension of the said bracket 34 is designed to support in the lower rear portion of the housing below the lamp 25 a plane mirror 35 which will thus be located at a cool portion thereof. The said mirror is positioned, preferably, at an angle of 22½ degrees to the vertical to pick up illuminated copy supported over the aperture 17 and to reflect it horizontally and substantially parallel to the originally reflected rays from the source of illumination or lamp 25. The beam of light thus reflected by the said mirror 35 is coaxial with the projecting lens 16 mounted in the vertical portion 15 of the front wall. A secondary reflector element 39 may be attached to the inner face of wall portion 15' to intensify the illumination of the lower portion of said copy which is further removed from the lamp than the upper portion.

To admit of convenient axial adjustment of the lens for focussing the projected image, the lens may be mounted within a cylindrical guide 36 directed inwardly from the inner face of wall 15, and a spiral slot 37 is provided in the cylindrical guide to cooperate with a pin 38 projecting outwardly from the periphery of the lens barrel whereby the lens will be advanced or retracted as desired when manually turned.

Figure 3:
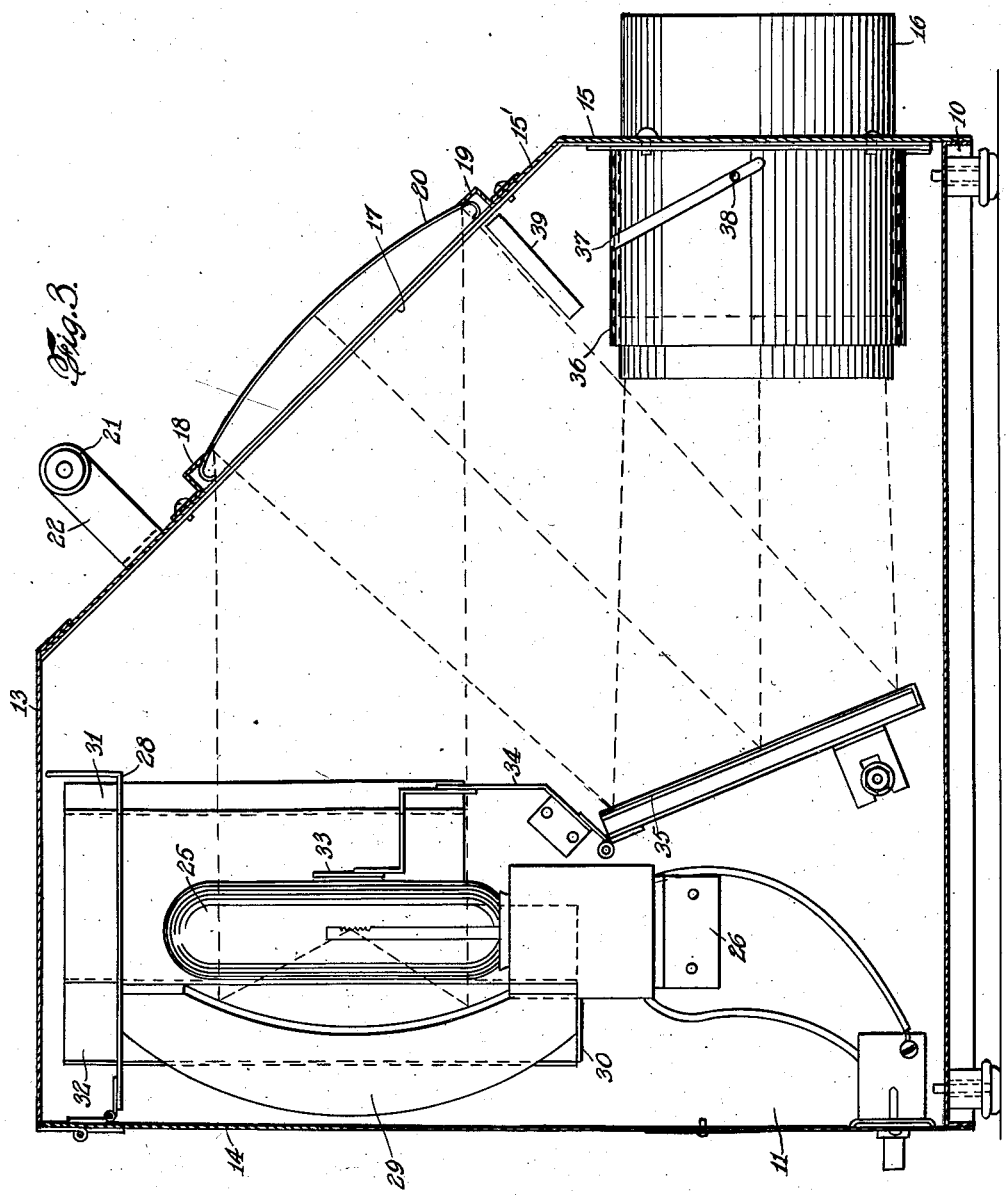
Fig. 3 is a longitudinal section through the projector, taken on the line 3—3, Fig. 2 of the drawings, and looking in the direction of the arrows.

In the operation of the novel projector, reference being had to Fig. 3 of the drawings and wherein the paths of the light rays are indicated by broken lines, it will be noted that the beam of light from the lamp 25 will impinge on the copy to illuminate the same. The illuminated area of this copy is then imaged in the lower mirror 35 reversely (right-left) and upside down, the copy having been mounted in its carrier 20 in such upside-down position. This image is, therefore, in such a position that the objective lens 16 produces an image, when projected, which is right side up and in correct left-right relationship conforming to the original copy.

I claim:

1. A projector for projecting images from opaque copy, comprising a housing with front wall rearwardly inclined at the upper portion and provided with a copy-receiving aperture, the lower portion of said front wall being substantially vertical, a projecting lens mounted in the said vertical portion of the front wall for axial adjustment, a vertically disposed projecting lamp mounted within the upper rear portion of the housing, a reflector disposed in the housing behind said lamp coaxially with the copy-receiving aperture to reflect light rays thereto horizontally from said lamp, and a mirror mounted in the lower rear portion of the housing to receive angularly in a reverse direction rays of light from illuminated copy retained over the copy-receiving aperture and adapted to direct the rays parallel to the first-named reflection and in the optical axis of and toward the said projection lens.

2. The projector as claimed in claim 1, wherein the lamp is an electric, concentrated filament lamp, and an opaque screening means is associated with the said lamp in close proximity thereto to intercept direct rays of light therefrom in the direction of reflection by the reflector and of the lamp filament.

3. The projector as claimed in claim 1, wherein the upper portion of the front wall is inclined at an angle of 45 degrees to the vertical, the lamp is a vertically disposed electric lamp with the reflector vertically disposed behind the same, and the mirror is disposed at an angle of 22½ degrees to the vertical.

4. The projector as claimed in claim 1, wherein a cover top for the housing is hinged to the upper edge of the rear wall of the housing and is provided with a ventilation opening in the longitudinal axis of said lamp, and a light baffle is hinged to the inner face of the rear wall of the housing to swing over the top of the lamp between it and the opening of said cover top.

5. The projector as claimed in claim 1, wherein a cover top for the housing is hinged to the upper edge of the rear wall of the housing and is provided with a ventilation opening in the longitudinal axis of said lamp and a light baffle is hinged to the inner face of the rear wall of the housing to swing over the top of the lamp between it and the opening of said cover top and is provided with a relatively small opening in the longitudinal axis of said lamp.

6. The projector as claimed in claim 1, wherein the reflector for the lamp is retained by channel members attached to opposite side walls of the housing having respective shelves for supporting the lower rim portion of said reflector and with lateral guides for the rim; a cover top for the housing is hinged to the upper edge of its rear wall and is provided with a ventilation opening in the longitudinal axis of said lamp, and a light baffle is hinged to the inner face of the said rear wall to swing over the top of the lamp between it and the opening of said cover top for engagement with the upper rim portion of the said reflector.

7. A projector for projecting images from opaque copy, comprising a housing with front wall rearwardly inclined at the upper portion at an angle of 45 degrees to the vertical and provided with a copy-receiving aperture, the lower portion of said front wall being substantially vertical, a projecting lens mounted in the said vertical portion of the front wall for axial adjustment, a vertically disposed electric, concentrated-filament projecting lamp mounted within the upper rear portion of the housing, a reflector disposed in the housing behind said lamp coaxially with the copy-receiving aperture to reflect light rays thereto horizontally from said lamp, an opaque screening means associated with the said lamp in close proximity thereto to intercept direct rays of light therefrom in the direction of reflection by said reflector and of the lamp filament, a cover top for the housing hinged to the upper edge of its rear wall and provided with a ventilation opening in the longitudinal axis of said lamp, a light baffle hinged to the inner face of the rear wall to swing over the top of the lamp between it and the opening of said cover top and provided with a relatively small opening in the longitudinal axis of said lamp, and a mirror mounted in the lower rear portion of the housing at an angle of 22½ degrees to the vertical to receive rays of light angularly in a reverse direction from illuminated copy retained over the copy-receiving aperture and adapted to direct rays parallel to the first-named reflection and in the optical axis of and toward the said projecting lens.

WALTER E. SCHWANHAUSSER.